(12) United States Patent
Sakai

(10) Patent No.: US 8,648,548 B2
(45) Date of Patent: Feb. 11, 2014

(54) CURRENT GENERATOR

(75) Inventor: Koichi Sakai, New Taipei (TW)

(73) Assignee: Princeton Technology Corporation, New Taipei (TW)

( * ) Notice: Subject to any disclaimer, the term of this patent is extended or adjusted under 35 U.S.C. 154(b) by 0 days.

(21) Appl. No.: 13/339,935

(22) Filed: Dec. 29, 2011

(65) Prior Publication Data

US 2012/0169417 A1 Jul. 5, 2012

(30) Foreign Application Priority Data

Dec. 30, 2010 (TW) .............................. 99225553 U

(51) Int. Cl.
*H05B 37/02* (2006.01)
(52) U.S. Cl.
USPC ............ 315/307; 315/291; 315/294; 315/308
(58) Field of Classification Search
USPC ......................... 315/291, 294, 297, 307, 308
See application file for complete search history.

(56) References Cited

U.S. PATENT DOCUMENTS

| | | | |
|---|---|---|---|
| 7,733,034 B2 * | 6/2010 | Kotikalapoodi et al. | 315/294 |
| 7,977,891 B2 * | 7/2011 | Shiu et al. | 315/291 |
| 8,247,992 B2 * | 8/2012 | Liu et al. | 315/291 |
| 8,278,840 B2 * | 10/2012 | Logiudice et al. | 315/294 |
| 2010/0141159 A1 * | 6/2010 | Shiu et al. | 315/185 R |
| 2010/0148683 A1 * | 6/2010 | Zimmermann et al. | 315/224 |
| 2011/0001433 A1 * | 1/2011 | Lee et al. | 315/185 R |

* cited by examiner

*Primary Examiner* — Douglas W Owens
*Assistant Examiner* — Thai Pham
(74) *Attorney, Agent, or Firm* — Muncy, Geissler, Olds & Lowe, PLLC

(57) ABSTRACT

A current generating circuit for providing a plurality of load current is provided. The current generating circuit includes: a plurality of operational amplifier, coupled to a reference voltage source, wherein each positive input end of the a plurality of operational amplifier receives the reference voltage source; a plurality of semiconductor switch, used for controlling the output of a plurality of load current, wherein each semiconductor switch is respectively coupled to a corresponding operational amplifier and a load, and the semiconductor switch operates according to signals outputted from the output end of the corresponding operational amplifier to output the corresponding load current; and a control unit, coupled to a plurality of operational amplifier, for outputting a control signal to control the operation of a plurality of operational amplifier.

5 Claims, 3 Drawing Sheets

CURRENT GENERATOR

CROSS REFERENCE TO RELATED APPLICATIONS

This Non-provisional application claims priority under 35 U.S.C. §119(a) on Patent Application No(s). 99225553, filed in Taiwan, Republic of China on Dec. 30, 2010, the entire contents of which are hereby incorporated by reference.

BACKGROUND OF THE INVENTION

1. Field of the Invention

The present invention relates to current generators, and in particular relates to the current generators used in car lamps.

2. Description of the Related Art

In car lamp systems, the brake light and the running light usually share the same light emitting diodes (LEDs). In a brake light mode, the LEDs emit strong light with large current, and in a running light mode, the LEDs emits weak light with small current.

Please refer to FIG. 1, which is a diagram showing the structure of a current generator in a car lamp system. The purpose of the current generator 100 is to provide two kinds of currents to make the car lamp system work in two operation modes. The difference between the two currents is usually huge. For example, the large current may reach 300 mA, while the small current may be merely 5 mA. The current generator 100 comprises an operational amplifier OP, a transistor Q and a resistor R, wherein the transistor Q outputs a current at its drain. The operational amplifier OP receives two kinds of voltages (for example, 300 mV and 5 mV,) from a system (not shown) at its positive end "+", where there is usually an offset voltage (about 3 mV) between the positive end "+" and the negative end "−" of the operational amplifier OP. It is assumed that the resistance of the resistor R is 1Ω in the following examples for illustration. When a 300 mV reference voltage is applied to the positive end "+" of the operational amplifier OP, the drain of the transistor Q may produce a current of (300 mV−3 mV)/1Ω=297 mA, which ideally reaches 99% of the target current 300 mV. However, when a 5 mV reference voltage is applied to the positive end "+" of the operational amplifier OP, the drain of the transistor Q may produce a current of (5 mV−3 mV)/1Ω=2 mA, which merely reaches 40% of the target current 5 mV.

Therefore, a new circuit which can provide two precise currents is needed.

BRIEF SUMMARY OF THE INVENTION

The present invention provides a current generating circuit for providing a plurality of load current. The current generating circuit comprises: a plurality of operational amplifier, coupled to a reference voltage source, wherein each positive input end of a plurality of operational amplifier receives the reference voltage source; a plurality of semiconductor switch, used for controlling the output of a plurality of load current, wherein each semiconductor switch is respectively coupled to a corresponding operational amplifier and a load, and the semiconductor switch operates according to signals outputted from the output end of the corresponding operational amplifier to output the corresponding load current; and a control unit, coupled to a plurality of operational amplifier, for outputting a control signal to control the operation of a plurality of operational amplifier.

The present invention also provides another current generating circuit for providing a plurality of load current. The current generating circuit comprises: a first operational amplifier, coupled to a reference voltage source, wherein a positive input end of the first operational amplifier receives the reference voltage source; a second operational amplifier, coupled to the reference voltage source, wherein a positive input end of the second operational amplifier receives the reference voltage source; a first semiconductor switch, coupled between the first operational amplifier and a load, wherein a drain of the first semiconductor switch is coupled to the load, and a gate of the first semiconductor switch is coupled to an output end of the first operational amplifier; a second semiconductor switch, coupled between the second operational amplifier and the load, wherein a drain of the second semiconductor switch is coupled to the load, and a gate of the second semiconductor switch is coupled to an output end of the second operational amplifier; a control unit, coupled to the first operational amplifier and the second operational amplifier, for outputting a control signal to control the operation of the first operational amplifier and the second operational amplifier.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1:
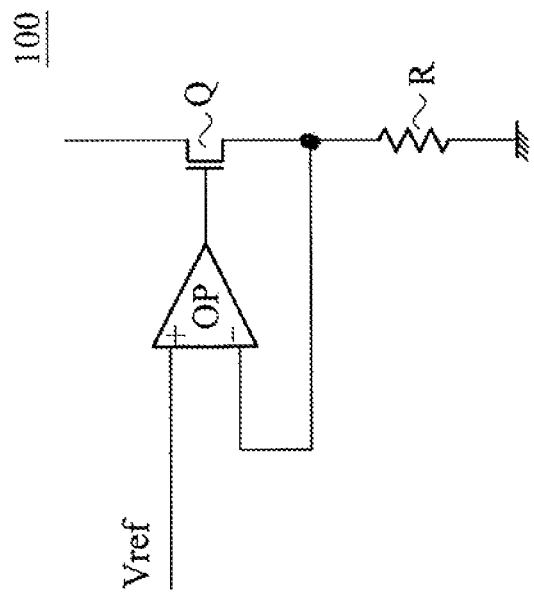
FIG. 1 is a diagram showing the structure of a current generator in a car lamp system.
Figure 2:
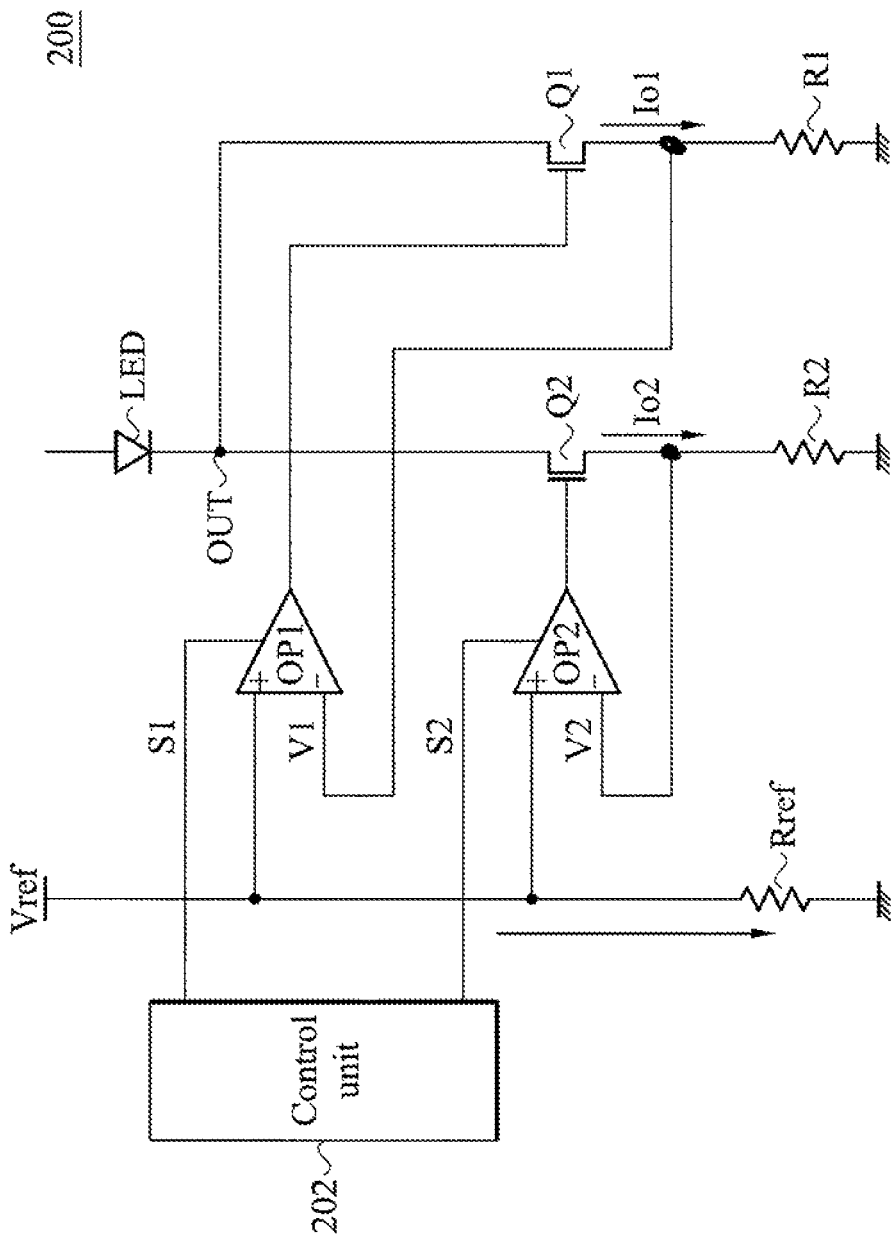
FIG. 2 is a schematic diagram of a current generating circuit according to a first embodiment of the present invention first.

FIG. 2 is a schematic diagram of a current generating circuit according to a first embodiment of the present invention. The current generating circuit of the present invention provides a plurality of load current for the load. For illustration, there are two load currents generated in the following examples. The load in the present invention, for example, is light emitting diodes (LEDs), which will be used in the following examples either.

The current generating circuit 200 of the present invention comprises a first operational amplifier OP1, a second operational amplifier OP2, a first semiconductor switch Q1, a second semiconductor switch Q2 and a control unit 202.

The reference voltage source Vref of the present invention is coupled to the positive input ends of the first operational amplifiers OP1 and the second operational amplifier OP2. The reference voltage source Vref of the present invention provides voltages to the operational amplifiers OP1 and OP2. In addition, the reference voltage source Vref is further coupled to an end of a reference resistor Rref, where the other end of the reference resistor Rref is coupled to the ground, as shown in FIG. 2.

The first operational amplifier OP1 of the present invention is coupled to the reference voltage source Vref, where the positive input end (labeled as "+") of the first operational amplifier OP1 is coupled to the reference voltage source Vref. Similarly, the positive input end (labeled as "+") of the second operational amplifier OP2 of the present invention is also coupled to the reference voltage source Vref. It should be noted that, in other embodiments for generating more than two load currents, the same number of operational amplifiers are needed, and the reference voltage Vref should be respectively provided to each positive input end of those operational amplifiers.

In the present invention, the first semiconductor switch Q1, corresponding to the first operational amplifier OP1, is coupled between the first operational amplifier OP1 and the load LED. Specifically, the drain of the first semiconductor switch Q1 is coupled to the load LED, and the gate of the first semiconductor switch Q1 is coupled to the output end of the first operational amplifier OP1. Similarly, the second semiconductor switch Q2 corresponds to the second operational amplifier OP2 and is coupled between the second operational amplifier OP2 and the load LED. Specifically, the drain of the second semiconductor switch Q2 is coupled to the load LED, and the gate of the second semiconductor switch Q2 is coupled to the output end of the second operational amplifier Q2. A plurality of semiconductor switch (i.e., Q1 and Q2) of the present invention is used for controlling the output of a plurality of load current (i.e., Io1 and Io2). Each semiconductor switch is respectively coupled between a corresponding operational amplifier and the load. Each semiconductor switch is turned on or off according to a signal outputted by its corresponding operational amplifier to provide a corresponding load current.

The source of the semiconductor switch of the present invention is respectively coupled to a negative input end (labeled as "−") of the operational amplifier and an end of a resistor, where the other end of the resistor is coupled to the ground. In this embodiment, the source of the first semiconductor switch Q1 is coupled to the negative input end of the first operational amplifier OP1 and an end of the first resistor R1, wherein the other end of the resistor R1 is coupled to the ground. Similarly, the source of the second semiconductor switch Q2 is coupled the negative input end of the second operational amplifier OP2 and an end of the second resistor R2, where the other end of the resistor R2 is coupled to the ground.

The control unit 202 of the present invention is coupled to an enabling end S1 of the first operational amplifier OP1 and an enabling end S2 of the second operational amplifier OP2 for outputting a control signal to control the operation of the first operational amplifier OP1 and the second operational amplifier OP2. In addition, each output end of the operational amplifiers OP1 and OP2 is coupled to the gate of its corresponding semiconductor switch Q1 or Q2 for sending a signal to the gate. Note that the control unit 202 enables only one operational amplifier in each operation procedure, for example, enabling the first operational amplifier OP1 via the enabling end S1 or the second operational amplifier OP2 via the enabling end S2.

Specifically, in the embodiment of FIG. 2, the first resistor R1 is coupled between the negative input end of the first operational amplifier OP1 and the ground for generating a first feedback voltage V1 on the negative input end of the first operational amplifier OP1. The drain (first drain) of the first transistor Q1 is coupled to the output end OUT. When the first operational amplifier OP1 is enabled by the control unit 202, the output end OUT outputs a first current Io1. For example, if the reference voltage is 300 mV, the first resistor R1 is 1Ω, and the offset voltage of the first operational amplifier OP1 is 3 mV, the first current Io1 will be (300 mV−3 mV)/1Ω=297 mA, which reaches 99% of the target current 300 mA.

Similarly, the second resistor R2 is coupled between negative input end of the second operational amplifier OP2 and the ground for producing a second feedback voltage V2 on the negative input end of the second operational amplifier OP2. The drain (second drain) of the second transistor Q2 is coupled to the output end OUT. When the second operational amplifier OP2 is enabled and the first operational amplifier OP1 is disabled by the control unit 202, the output end OUT outputs a second current Io2. For example, if second resistor R2 is 60Ω, the reference voltage is 300 mV, and the offset voltage of the second operational amplifier OP2 is 3 mV, the second current Io2 will be (300 mV−3 mV)/60=4.95 mA, which reaches 99% of another target current 5 mA. From the above, the current generator of the present invention can generate two currents which are much more precise than those in the prior art. Since the current passing through the second transistor Q2 is much smaller (5 mA) than that passing through the first transistor Q1, the size of the second transistor Q2 can be designed to be much smaller than that of the first transistor Q1.

Note that although there are two currents discussed in the embodiments of the present invention, those skilled in the art can generate more than two currents by adding more components illustrated in the embodiments according to the spirit of the present invention.

Second Embodiment

Figure 3:
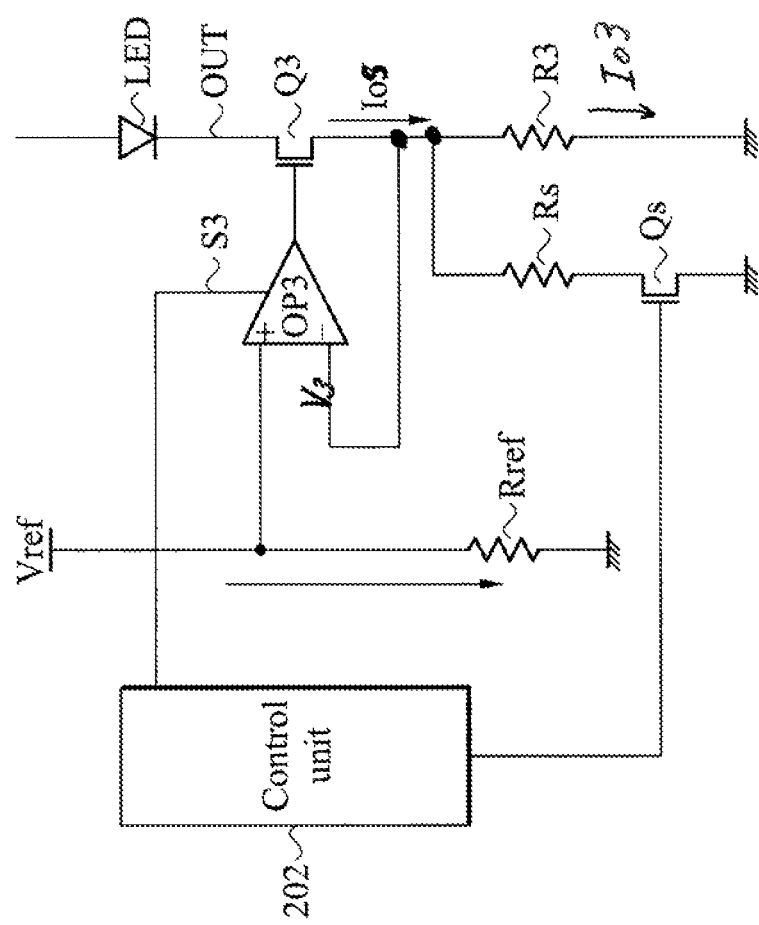
FIG. 3 is a schematic diagram of the current generating circuit according to a second embodiment of the present invention second.

FIG. 3 is a schematic diagram of the current generating circuit according to a second embodiment of the present invention. In this embodiment, the current generating circuit of the present invention comprises a third operational amplifier OP3, a resistor R3 and transistor Q3, a reference voltage source Vref and control unit 202, which are similar to the components in the previous embodiments. However, the current generating circuit further comprises a resistor Rs and a transistor Qs.

The third operational amplifier OP3 comprises a positive input end (+), a negative input end (−), an enabling end S3 and an amplifier output. The resistor R3 is coupled between the negative input end of the third operational amplifier OP3 and the ground for producing a third feedback voltage V3 on the negative input end of the third operational amplifier OP3. The positive input end of the third operational amplifier OP3 is used for receiving the reference voltage Vref, and the negative input end of the third first operational amplifier OP3 is used for receiving the third feedback voltage V3 from the resistor R3. The enabling end S3 is used for being enabled or disabled by the control unit 202. The gate of the transistor Q3 comprises a gate, a drain and a source. The source of the transistor Q3 is coupled to the negative input end of the third operational amplifier OP3. The gate of the transistor Q3 is coupled to the amplifier output end of the third operational amplifier OP3 for receiving the signal outputted from the third operational amplifier OP3. The drain of the transistor Q3 is coupled to the output end OUT.

The resistor Rs is coupled to the negative input end of the third operational amplifier OP3, and the transistor Qs is coupled to the resistor Rs in series. The transistor Q3 receives signals from the control unit 202 at its gate and then works.

For illustration, in the following examples it is assumed that the resistance of the third resistor R3 is 60Ω, the resistance of the resistor Rs is 0.9Ω, the internal resistance of the transistor Qs is 0.1Ω (the resistance of combination of the resistor Rs and the transistor Qs in series connection is 1Ω), and the offset voltage of the third operational amplifier OP3 is 3 mV. When the third operational amplifier OP3 is enabled and the transistor Qs is turned on, the fourth current IoS will be (300 mV−3 mV)/1=297 mA, which reaches 99% of the target current 300 mA. When the third operational amplifier OP3 is enabled but the transistor Qs is turned off, the third current Io3 is (300 mV−3 mV)/60=4.95 mA, which also reaches 99% of another target current 5 mA.

No matter in the first or the second embodiment of the present invention, the errors caused by the offset voltage of the operational amplifiers can be appropriately mitigated, and thus currents which are more precise than those in the prior art can be obtained. The current generator of the present invention can be integrated in an LED driving chip in a car lamp system for providing two or more than two precise currents. It should be noted that although the present invention can be used for the brake light and the running light of the car lamp system, those skilled in the art can understand that the present invention should not be limited thereto.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A current generating circuit for providing a plurality of load currents, comprising:
   an operational amplifier coupled to a reference voltage source, wherein a positive input end of the first operational amplifier receives the reference voltage source;
   a first semiconductor switch coupled between the operational amplifier and a load, wherein a drain of the first semiconductor switch is coupled to the load, and a gate of the first semiconductor switch is coupled to an output end of the operational amplifier;
   a second semiconductor switch coupled between the first semiconductor switch and a ground; and
   a control unit, coupled to the operational amplifier and the second semiconductor switch, for outputting a control signal to control the operation of the operational amplifier and the second semiconductor switch.

2. The current generating circuit as claimed in claim 1, wherein the reference voltage source is coupled to the positive input end of the operational amplifier and an end of a reference resistor, and the other end of the reference resistor is coupled to the ground.

3. The current generating circuit as claimed in claim 1, wherein:
   a source of the first semiconductor switch is coupled to a negative input end of the operational amplifier, an end of a first resistor, and an end of a second resistor, and the other end of the first resistor is coupled to the ground, and
   a source of the second semiconductor switch is coupled to the ground, and a gate of the second semiconductor switch is coupled to the control unit, and a drain of the second semiconductor switch is coupled to the other end of the second resistor.

4. The current generating circuit as claimed in claim 3, wherein a first current flows through the first resistor, and a second current flows through the second resistor when control unit enables the second semiconductor by outputting the control signal.

5. The current generating circuit as claimed in claim 1, wherein the load comprises a light emitting diode.

* * * * *